United States Patent [19]

Pilliod, Jr. et al.

[11] 4,351,380

[45] Sep. 28, 1982

[54] TRACK BELT ASSEMBLY

[75] Inventors: Charles J. Pilliod, Jr., Akron, Ohio; Roger E. Payne, Okemos, Mich.

[73] Assignee: The Goodyear Tire & Rubber Company, Akron, Ohio

[21] Appl. No.: 221,147

[22] Filed: Dec. 29, 1980

[51] Int. Cl.³ .................. B60C 27/06; B60C 9/00; B62D 55/24
[52] U.S. Cl. .................. 152/169; 152/176; 152/185.1; 152/188; 180/9; 198/699; 305/35 EB; 305/54; 428/58; 428/189; 428/223; 440/90; 474/162; 474/901
[58] Field of Search ............... 152/185.1, 175, 176, 152/225 R, 169, 179, 182, 183, 187, 188, 191, 213 A, 213 R, 228, 225 C; 180/9; 305/193, 5 R, 35 EB, 40, 34, 54; 24/38; 198/698, 699; 440/96, 90; 428/223, 58, 189; 474/901, 152, 162

[56] References Cited

U.S. PATENT DOCUMENTS

| 1,588,255 | 6/1926 | Maxwell | 428/58 X |
| 3,300,826 | 1/1967 | Read | 24/38 |
| 3,481,807 | 12/1969 | Kanamori | 24/38 X |
| 3,930,689 | 1/1976 | Maki | 305/35 EB |
| 4,237,950 | 12/1980 | Domes et al. | 152/185.1 X |

Primary Examiner—John E. Kittle
Assistant Examiner—Thomas Bokan
Attorney, Agent, or Firm—Frank Pincelli

[57] ABSTRACT

The track belt assembly of the present invention comprises a plurality of shoes spaced about the periphery of a load-supporting structure. A reinforcing belt structure is disposed on the side of the shoe opposite the ground-engaging side thereof. Each shoe is secured at its lateral ends to the belt reinforcing structure by two separate anchor plates disposed on the side of the belt opposite that which is adjacent the shoes.

13 Claims, 10 Drawing Figures

TRACK BELT ASSEMBLY

The foregoing abstract is not to be taken as limiting the invention of this application, and in order to understand the full nature and extent of the technical disclosure of this application, reference must be made to the accompanying drawings and the following detailed description.

BACKGROUND OF THE INVENTION

This invention relates to an improved track belt assembly.

The track belt assembly of the present invention is generally designed for use on large earthmover vehicles and is subjected to high stress and loads under harsh environmental conditions such as in rock quarries, mines, foundries, and other areas where tires are subjected to puncture-producing and wear-inducing elements. Track belt assemblies of the prior art comprise a plurality of ground-engaging shoes spaced about the periphery of the supporting structure. The shoes are often secured to a single piece metal anchor plate which is securely mounted on the supporting structure. Clamped between the shoes and anchor plate may be a reinforcing belt structure. The anchor plates and shoes are secured together such as by a nut and bolt assembly.

The heavy loads on the shoes result in great stresses being developed in the nut and bolt assemblies. Especially high stress concentrations are developed in the areas of the anchor plates surrounding the holes in which bolts are passed. This may lead to premature failure.

Applicants have invented an improved track belt assembly wherein the stresses developed in the nut and bolt assemblies and adjacent areas of the keeper are substantially reduced. Additionally, applicants' invention has the further advantages of reduced manufacturing costs due to reduced tolerance requirements and reduced inventory of parts.

SUMMARY OF THE INVENTION

The track belt assembly of the present invention comprises a plurality of shoes spaced about the periphery of a load-supporting structure. A reinforcing belt structure is disposed on the side of the shoe opposite the ground-engaging side thereof. Each shoe is secured at its lateral ends to the belt reinforcing structure by two separate anchor plates disposed on the side of the belt opposite that which is adjacent the shoes.

DETAILED DESCRIPTION OF THE INVENTION

Figure 1:
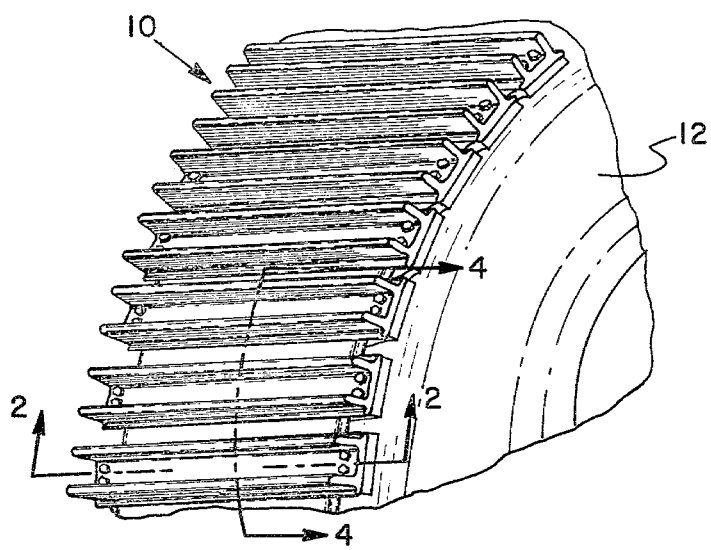
FIG. 1 is a perspective view of a portion of a track belt assembly made in accordance with the present invention mounted on a pneumatic tire.
Figure 2:
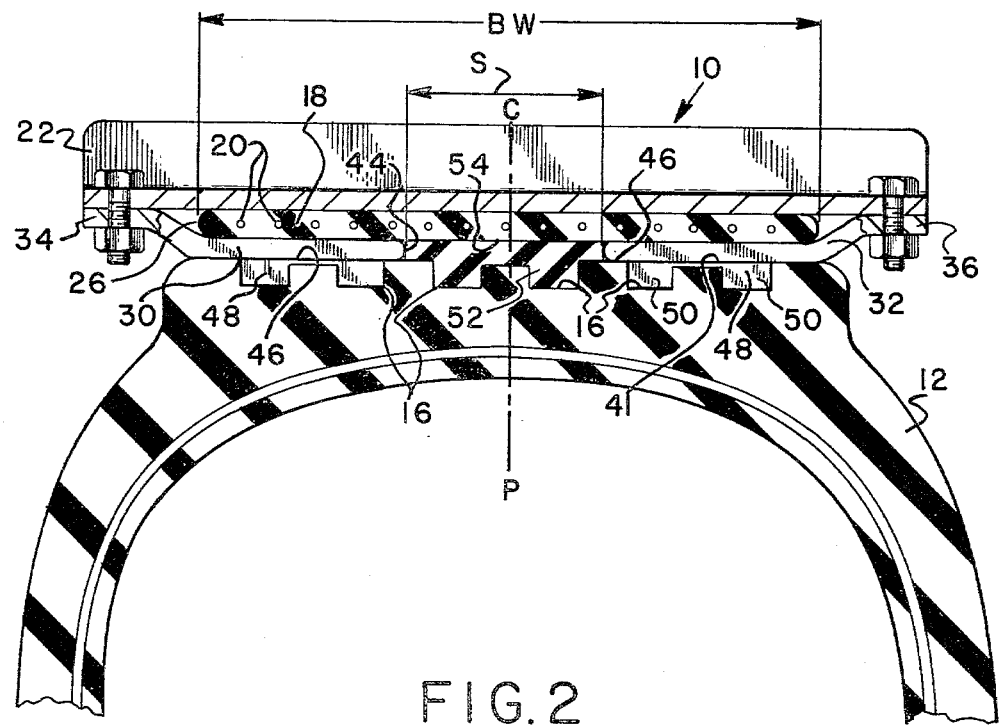
FIG. 2 is a fragmentary cross-sectional view taken along line 2—2 of FIG. 1.
Figure 3:
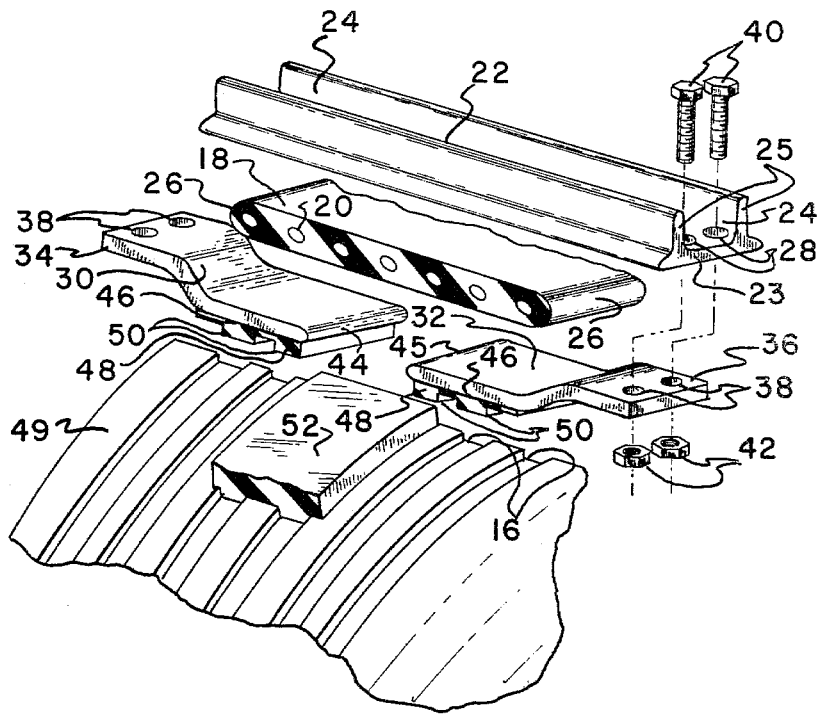
FIG. 3 is an exploded perspective view of FIG. 1 illustrating the components of the present invention.
Figure 4:
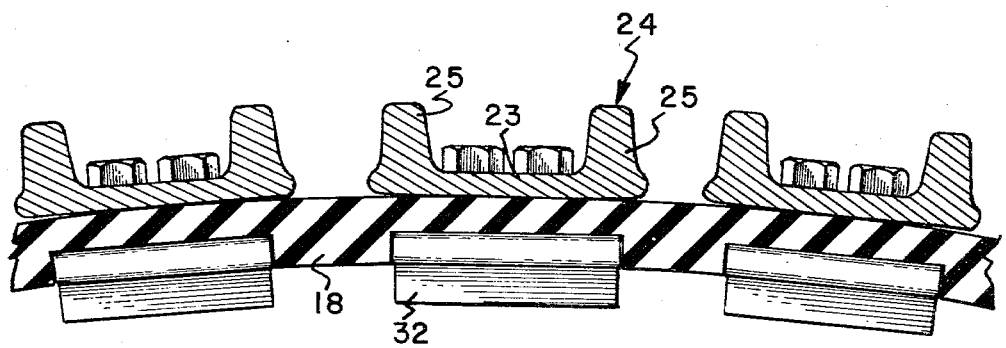
FIG. 4 is a fragmentary side view taken along the line 4—4 of FIG. 1.

Referring to FIGS. 1, 2, 3 and 4, there is illustrated a track belt assembly 10 made in accordance with the present invention mounted on a pneumatic tire or elastomeric supporting structure 12. The particular embodiment illustrated is directed to a pneumatic tire 12. Other supporting structures not illustrated may be used for supporting the track belt assembly 10 of the present invention. The tire 12 has a radially outer surface with a plurality of circumferentially extending grooves 16 for receiving projections in the track belt assembly 10.

The track belt assembly 10 is provided with a reinforcing belt structure 18 having embedded therein a plurality of substantially inextensible cords 20. In the particular embodiment illustrated, the belt reinforcing structure 18 comprises one ply layer of cords which lie at an angle of approximately zero degrees with respect to the mid-circumferential centerplane CP of the tire 12 which has been helically wound about the periphery of the tire 12. However, the belt structure 18 may be formed in any desired manner and be composed of any desired number of layers. The cords 20 may be any desired angle and may be comprised of any material normally used for reinforcing rubber articles, for example, and not by way of limitation, nylon, fiberglass, aramid, and steel. In the particular embodiment illustrated, the cords 20 are made from steel.

A plurality of ground-engaging shoes 22 are placed about the outer periphery of the belt structure 18. The shoes 22 each have a base portion 23 disposed adjacent belt structure 18 and a pair of traction members 25 which extend from the side of the base 23 opposite the side adjacent belt structure 18. While shoes 22 have been shown as having a substantially channel-shaped cross-sectional configuration, it is understood that the shoes may have any desired shape or configuration. The shoes 22 each have a pair of lateral ends 24 which extend axially beyond the lateral edges 26 of the belt structure 18. Provided at each lateral end 24 of the shoes 22 are a pair of bolt openings 28.

In accordance with the present invention, there is provided a pair of anchor plates 30, 32 which are mounted on the side of the belt structure 18 opposite the shoes 22. The anchor plates 30, 32 each have outer ends 34, 36, respectively, which extend axially outwardly of the lateral ends 26 of the reinforcing belt structure 18. The ends 34, 36 of the anchor plates 30, 32 are each provided with a pair of openings 38 which are alignable with the bolt openings 28 of the shoes 22. The anchor plates 30, 32 are securely fastened to the shoes 22 by any suitable fastening means. In the particular embodiment illustrated in FIGS. 1, 2 and 3, there are provided bolts 40 which pass through openings 28 in the shoes 22 and openings 38 in the anchor plates 30, 32 and are threaded into nuts 42.

Secured to the radially inner surface 46 of anchor plates 30, 32 respectively, is an elastomeric member 48 which is shaped so as to provide a plurality of projections 50 for individually locking with corresponding grooves 16 on the radially outer surface of the tire 12. In the particular embodiment illustrated, elastomeric member 48 is molded to the radially inner surface 46, however, elastomeric member 48 may be adhered to the radially inner surface 46 of anchor plates 31, 32 by any means desired or may be an integral part of the anchor plates 30, 32. The interlocking of projections 50 with grooves 16 of the supporting structure 12 provides the appropriate axial alignment between the track belt assembly 10 and supporting structure 12, and also prevents the track belt assembly from walking off the side of the supporting structure 12.

Anchor plates 30, 32 extend axially across the reinforcing belt structure a distance sufficient to secure the shoes 22 to the supporting structure 12. It is recommended that each anchor plate should extend axially across belt structure 18 a distance of at least 15 percent of the belt width BW. In the particular embodiment illustrated in FIGS. 1, 2 and 3, each anchor plate 30, 32 extends axially across the belt reinforcing structure 18 a distance of approximately 30 percent of the belt width BW. The anchor plates 30, 32 are spaced axially apart such that the axially inner ends 44, 45 of anchor plates 30, 32 respectively, are spaced apart a distance S, the distance S preferably being at least ten percent of the belt width BW.

The belt assembly illustrated in FIGS. 1, 2, 3 and 4 is designed primarily for placement on tires previously having a single piece anchor plate. As a result, a space is formed between the axially inner ends 44, 45 of anchor plates 30, 32. In the particular embodiment illustrated, a separate elastomeric spacer 52 is placed between inner ends 44, 45, anchor plates 30, 32 and has a cross-sectional configuration which conforms to the outer radial surface 49 of the tire 12 and radial inner surface 54 of belt structure 18. The particular size and shape of the spacer 52 will depend upon the size of the supporting structure 12 and length of the anchor plates 30, 32. Spacer 52 in the embodiment illustrated is shown as a separate piece, however, spacer 52 may be molded to the tire or belt structure so as to be integral therewith.

Figure 5:
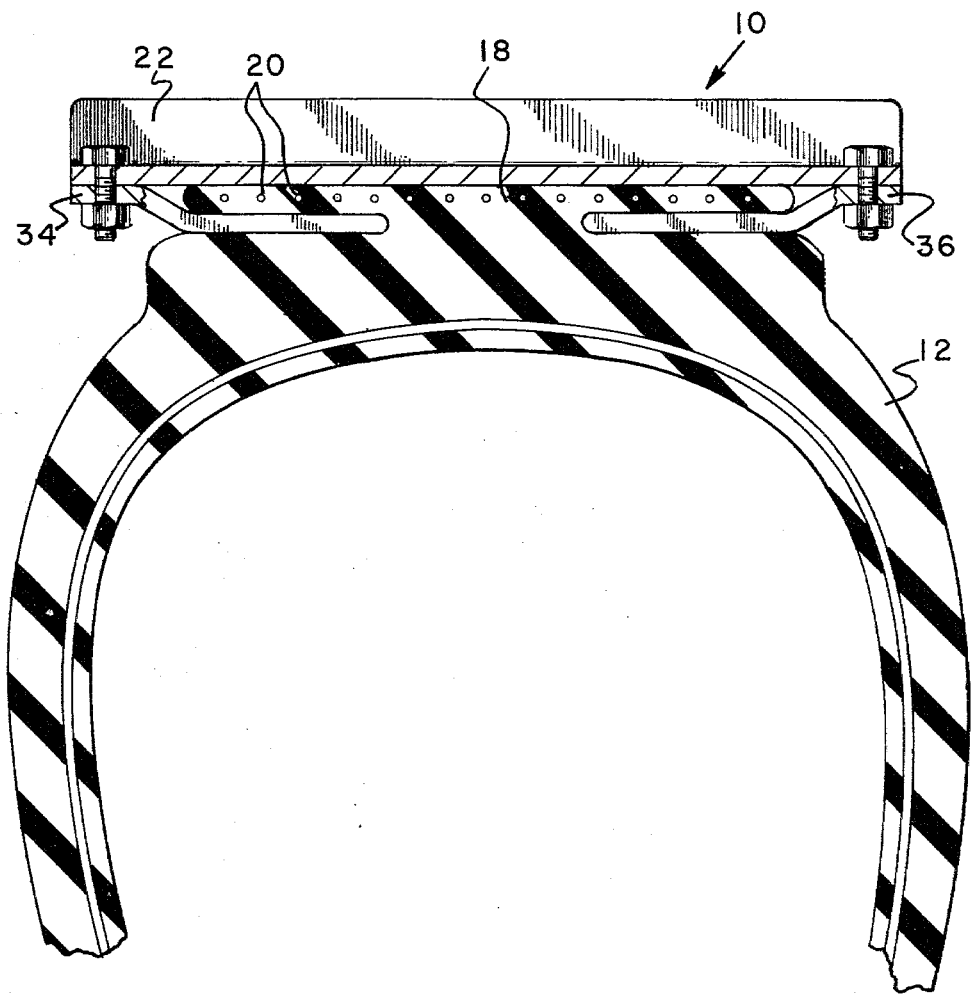
FIG. 5 is a fragmentary cross-sectional view similar to FIG. 2 illustrating a modified form of the present invention.

The embodiment illustrated in FIGS. 1, 2, 3 and 4 depict the belt structure 18, anchor plates 30, 32 and spacer 52, as separate individual parts. However, if desired, these parts may be integrally formed or removable as a part of the tire 12 as illustrated in FIG. 5.

Figure 10:
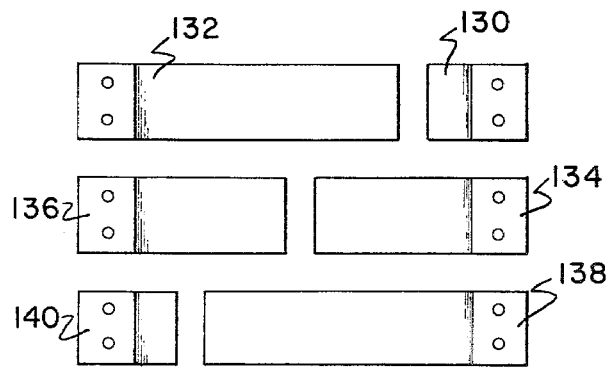
FIG. 10 is a diagrammatical representation of several pairs of associated circumferentially adjacent anchor plates having different lengths.

In the embodiment illustrated in FIGS. 1, 2, 3 and 4, circumferentially adjacent anchor plates 30, 32 are substantially identical in length. However, if desired, anchor plates of different length may be used on a single tire. FIG. 10 is a representation of several pairs of circumferentially adjacent anchor plates. In the embodiment illustrated in FIG. 10, anchor plates 130, 132 extend axially across the reinforcing belt structure a distance equal to approximately 20 percent and 70 percent of the belt width BW, respectively. Circumferentially adjacent anchor plates 134, 136 which are secured to the next circumferentially adjacent shoe, each extend axially across the belt reinforcing structure 18 a distance equal to approximately 45 percent of the belt width BW. Anchor plates 140, 138 which are disposed circumferentially adjacent to anchor plates 134, 136 extend axially across the belt reinforcing structure 18 a distance of approximately 20 percent and 70 percent, respectively, of the belt width BW, except that the shorter anchor plate 140 is disposed at the edge of the belt structure 18 opposite the edge at which the anchor plate 130 is disposed. This sequence or axial length relationship may be repeated or varied as desired.

Figure 6:
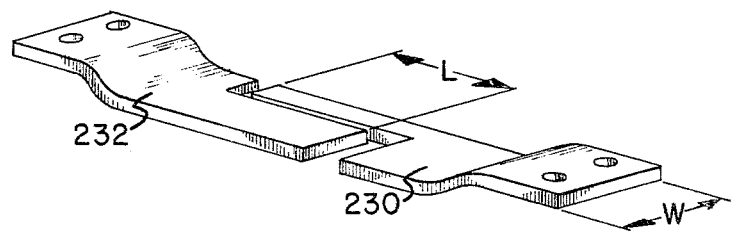
FIGS. 6 and 7 are perspective views of alternate embodiments of the associated anchor plates made in accordance with the present invention.
Figure 7:
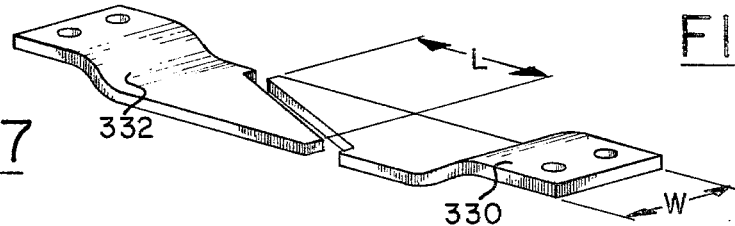

Referring to FIGS. 6 and 7, there is illustrated further embodiments of the present invention. In these embodiments the associated pairs of keeper plates for any one shoe are coextensive for at least a portion of their length and have a varying width for at least a portion of its length disposed beneath belt structure 18. FIG. 6 illustrates a pair of associated anchor plates 230, 232 wherein the width W of each anchor plate decreases in incremental steps. FIG. 7 illustrates a pair of associated anchor plates 330, 332 wherein the width W varies at a constant rate for a distance L which represents a portion of the length of the anchor plate. The associated anchor plates 230, 232 of FIG. 6 and anchor plates 330, 332 of FIG. 7 are coextensive in length a distance L which is at least 10 percent of the belt width BW. Preferably, the distance L is at least 20 percent of the belt width BW. While only two embodiments are illustrated in which associated anchor plates are coextensive for at least a portion of their length beneath belt structure 18 various other configurations, not illustrated, may be used and still be within the scope of the present invention.

Figure 8:
FIG. 8 is a side view of yet another alternate embodiment of associated anchor plates.
Figure 9:
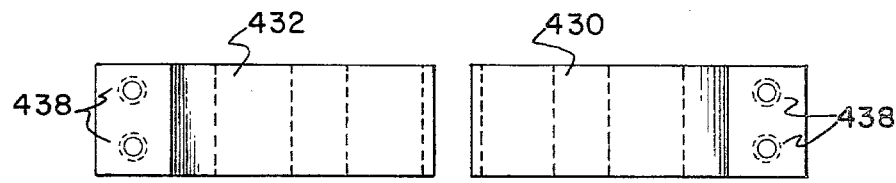
FIG. 9 is a top view taken of the anchor plates of FIG. 8.

In the embodiments previously discussed, the anchor plates are secured to the shoes by nut and bolt assemblies. However, the present invention is not limited to such. Referring to FIGS. 8 and 9, there is illustrated an alternate securing means. The axially outer end of anchor plates 430, 432 respectively, are each provided with a pair of threaded openings 438 for receiving a bolt which passes through the openings of the associated shoes. Preferably, the openings 438 of the anchor plates 430, 432 or bolt thread have a lock feature to resist loosening. This configuration has the advantage of having fewer mating surfaces thereby minimizing loosening of the fastening means which is generally associated with nut and bolt assemblies.

While certain representative embodiments and details have been shown for purposes of illustrating the invention, it will be apparent to those skilled in the art that various changes and modifications may be made therein without departing from the spirit or scope of the invention.

We claim:
1. An endless track belt assembly comprising:
an endless reinforcing belt structure having a pair of lateral edges;
a plurality of shoes spaced about the outer periphery of said reinforcing belt structure, each of said shoes having a pair of end portions which extend, respectively, beyond said pair of lateral edges of said reinforcing belt structures;
characterized by means securing said belt structure to said shoes including a plurality of circumferentially adjacent pairs of anchor plates, said anchor plates of each of said pair extending in spaced apart, end to end, generally coplanar relationship to each other and generally parallel superposition with one of said shoes;
a portion of said belt structure being disposed between said anchor plates and said shoes, each anchor plate having an inner end spaced from the inner end of the other anchor plate of said pair and an outer end secured to the outer end portion of said one of said shoes, the space formed between said anchor plates of each pair is such that said space is not circumferentially adjacent the space formed between the anchor plates of the circumferentially adjacent pair.

2. In combination, a removable track belt assembly, an inflatable load supporting structure, said removable track belt assembly being disposed about the outer periphery of said load supporting structure, said removable track belt assembly comprising:

a reinforcing belt structure extending about the circumference thereof, said reinforcing belt structure having a pair of lateral edges;

a plurality of shoes spaced about the outer periphery of said reinforcing belt structure, each of said shoes having a pair of end portions which extend, respectively, beyond said pair of lateral edges of said reinforcing belt structure;

characterized by means securing said belt structure to said shoes including a plurality of circumferentially adjacent pairs of anchor plates, said anchor plates of each of said pair extending in spaced apart, end to end, generally coplanar relationship to each other and generally parallel superposition with one of said shoes;

a portion of said belt structure being disposed between said anchor plates and said shoes, each anchor plate having an inner end spaced from the inner end of the other anchor plate of said pair and an outer end secured to the outer end portion of said one of said shoes, the space formed between said anchor plates of each pair is such that said space is not circumferentially adjacent the space formed between the anchor plates of the circumferentially adjacent pair.

3. In combination, a removable track belt assembly, a pneumatic tire, said removable track assembly being disposed about the outer periphery of said tire, said removable track belt assembly comprising:

a reinforcing belt structure extending about the circumference of said track belt assembly, said reinforcing belt structure having a pair of lateral edges;

a plurality of shoes spaced about the outer periphery of said reinforcing belt structure, each of said shoes having a pair of end portions which extend, respectively, beyond said pair of lateral edges of said reinforcing belt structure;

characterized by means securing said belt structure to said shoes including a plurality of circumferentially adjacent pairs of anchor plates, said anchor plates of each of said pair extending in spaced apart, end to end, generally coplanar relationship to each other and generally parallel superposition with at least one of said shoes, a portion of said belt structure being disposed between said anchor plates and shoes, each anchor plate having an inner end spaced from the inner end of the other anchor plate of said pair and an outer end secured to the outer end portion of said one of said shoes, the space formed between said anchor plates of each pair is such that said space is not circumferentially adjacent the space formed between the anchor plates of the circumferentially adjacent pair.

4. An integral pneumatic tire and track belt assembly comprising:

a reinforcing belt structure integrally formed in the radially outer portion of said tire, said belt reinforcing structure extending about the circumference of said tire and having a pair of lateral edges;

a plurality of removable shoes are spaced about the outer periphery of said reinforcing belt structure, each of said shoes having a pair of end portions which extend, respectively, beyond said pair of lateral edges of said reinforcing belt structure;

characterized by means securing said shoes to said pneumatic tire and track belt assembly including a plurality of circumferentially adjacent pairs of anchor plates, said anchor plates of each of said pair extending in spaced apart, end to end, generally coplanar relationship to each other and generally parallel superposition with at least one of said shoes, said anchor plates being integrally formed in said tire;

a portion of said reinforcing belt structure being disposed between said anchor plates and said shoes, each anchor plate having an inner end spaced from the inner end of the other anchor plate of said pair and an outer end secured to the outer end portion of said one of said shoes, the space formed between said anchor plates of each pair is such that said space is not circumferentially adjacent the space formed between the anchor plates of the circumferentially adjacent pair.

5. An integral inflatable load supporting structure and track belt assembly comprising:

a reinforcing belt structure integrally formed in the radially outer portion of said inflatable load supporting structure, said belt reinforcing structure extending about the circumference of said inflatable load supporting structure and having a pair of lateral edges;

a plurality of removable shoes are spaced about the outer periphery of said reinforcing belt structure, each of said shoes having a pair of end portions which extend, respectively, beyond said pair of lateral edges of said reinforcing belt structure;

characterized by means securing said shoes to said inflatable load supporting structure and track belt assembly including a plurality of circumferentially adjacent pairs of anchor plates, said anchor plates of each of said pair extending in spaced apart, end to end generally coplanar relationship to each other and generally parallel superposition with at least one of said shoes, said anchor plates being integrally formed in said inflatable load supporting structure;

a portion of said reinforcing belt structure being disposed between said anchor plates and shoes, each anchor plate having an inner end spaced from the inner end of the other anchor plate of said pair and an outer end secured to the outer end portion of said one of said shoes, the space formed between said anchor plates of each pair is such that said space is not circumferentially adjacent the space formed between the anchor plates of the circumferentially adjacent pair.

6. An endless track belt assembly comprising:

an endless reinforcing belt structure having a pair of lateral edges;

a plurality of shoes spaced about the outer periphery of said reinforcing belt structure, each of said shoes having a pair of end portions which extend, respectively, beyond said pair of lateral edges of said reinforcing belt structures;

characterized by means securing said belt structure to said shoes including a plurality of circumferentially adjacent pairs of anchor plates, said anchor plates of each of said pair extending in spaced apart, end to end, generally coplanar relationship to each other and generally parallel superposition with one of said shoes;

a portion of said belt structure being disposed between said anchor plates and said shoes, each anchor plate having an inner end spaced from the inner end of the other anchor plate of said pair and an outer end secured to the outer end portion of said one of said shoes, said anchor plates of each of said pair are spaced apart and extend axially beneath the reinforcing belt structure such that they are coextensive to each other for at least a portion of their axial length.

7. In combination, a removable track belt assembly, an inflatable load supporting structure, said removable track belt assembly being disposed about the outer periphery of said load supporting structure, said removable track belt assembly comprising:

a reinforcing belt structure extending about the circumference thereof, said reinforcing belt structure having a pair of lateral edges;

a plurality of shoes spaced about the outer periphery of said reinforcing belt structure, each of said shoes having a pair of end portions which extend, respectively, beyond said pair of lateral edges of said reinforcing belt structure;

characterized by means securing said belt structure to said shoes including a plurality of circumferentially adjacent pairs of anchor plates, and anchor plates of each of said pair extending in spaced apart, end to end, generally coplanar relationship to each other and generally parallel superposition with one of said shoes;

a portion of said belt structure being disposed between said anchor plates and said shoes, each anchor plate having an inner end spaced from the inner end of the other anchor plate of said pair and an outer end secured to the outer end portion of said one of said shoes, said anchor plates of each of said pair are spaced apart and extend axially beneath the reinforcing belt structure such that they are coextensive to each other for at least a portion of their axial length.

8. In combination, a removable track belt assembly, a pneumatic tire, said removable track assembly being disposed about the outer periphery of said tire, said removable track belt assembly comprising:

a reinforcing belt structure extending about the circumference of said track belt assembly, said reinforcing belt structure having a pair of lateral edges;

a plurality of shoes spaced about the outer periphery of said reinforcing belt structure, each of said shoes having a pair of end portions which extend, respectively, beyond said pair of lateral edges of said reinforcing belt structure;

characterized by means securing said belt structure to said shoes including a plurality of circumferentially adjacent pairs of anchor plates, said anchor plates of each of said pair extending in spaced apart, end to end, generally coplanar relationship to each other and generally parallel superposition with at least one of said shoes, a portion of said belt structure being disposed between said anchor plates and shoes, each anchor plate having an inner end spaced from the inner end of the other anchor plate of said pair and an outer end secured to the outer end portion of said one of said shoes, said anchor plates of each of said pair are spaced apart and extend axially beneath the reinforcing belt structure such that they are coextensive to each other for at least a portion of their axial length.

9. An integral pneumatic tire and track belt assembly comprising:

a reinforcing belt structure integrally formed in the radially outer portion of said tire, said belt reinforcing structure extending about the circumference of said tire and having a pair of lateral edges;

a plurality of removable shoes are spaced about the outer periphery of said reinforcing belt structure, each of said shoes having a pair of end portions which extend, respectively, beyond said pair of lateral edges of said reinforcing belt structure;

characterized by means securing said shoes to said pneumatic tire and track belt assembly including a plurality of circumferentially adjacent pairs of anchor plates, said anchor plates of each of said pair extending in spaced apart, end to end, generally coplanar relationship to each other and generally parallel superposition with at least one of said shoes, said anchor plates being integrally formed in said tire;

a portion of said reinforcing belt structure being disposed between said anchor plates and said shoes, each anchor plate having an inner end spaced from the inner end of the other anchor plate of said pair and an outer end secured to the outer end portion of said one of said shoes, said anchor plates of each of said pair are spaced apart and extend axially beneath the reinforcing belt structure such that they are coextensive to each other for at least a portion of their axial length.

10. An integral inflatable load supporting structure and track belt assembly comprising:

a reinforcing belt structure integrally formed in the radially outer portion of said inflatable load supporting structure, said belt reinforcing structure extending about the circumference of said inflatable load supporting structure and having a pair of lateral edges;

a plurality of removable shoes are spaced about the outer periphery of said reinforcing belt structure, each of said shoes having a pair of end portions which extend, respectively, beyond said pair of lateral edges of said reinforcing belt structure;

characterized by means securing said shoes to said inflatable load supporting structure and track belt assembly including a plurality of circumferentially adjacent pairs of anchor plates, said anchor plates of each of said pair extending in spaced apart, end to end, generally coplanar relationship to each other and generally parallel superposition with at least one of said shoes, said anchor plates being integrally formed in said inflatable load supporting structure;

a portion of said reinforcing belt structure being disposed between said anchor plates and shoes, each anchor plate having an inner end spaced from the inner end of the other anchor plate of said pair and an outer end secured to the outer end portion of said one of said shoes, said anchor plates of each of said pair are spaced apart and extend axially beneath the reinforcing belt structure such that they are coextensive to each other for at least a portion of their axial length.

11. The invention according to claim 6, 7, 8, 9 or 10 further characterized in that the circumferential width of said anchor plates of each of said pair varies along its axial length for at least a portion of its length.

12. The invention according to claim 11 further characterized by the width of said anchor plates varying in incremental steps.

13. The invention according to claim 11 further characterized by said width of each of said anchor plates varies in a substantially continuous manner for at least a portion of its length.

* * * * *